(12) United States Patent
Feuerstein

(10) Patent No.: US 8,087,227 B2
(45) Date of Patent: Jan. 3, 2012

(54) CONNECTOR

(75) Inventor: Oliver Feuerstein, Hattingen (DE)

(73) Assignee: Schmiedestuck-Vertrieb Feuerstein GmbH, Hattingen (DE)

( * ) Notice: Subject to any disclaimer, the term of this patent is extended or adjusted under 35 U.S.C. 154(b) by 92 days.

(21) Appl. No.: 12/772,139

(22) Filed: Apr. 30, 2010

(65) Prior Publication Data

US 2011/0265441 A1 Nov. 3, 2011

(51) Int. Cl.
*B21L 13/00* (2006.01)
*F16G 15/02* (2006.01)
(52) U.S. Cl. .................. 59/87; 59/85; 59/86; 59/35.1
(58) Field of Classification Search .............. 59/30, 35.1, 59/4, 85, 86, 87, 938
See application file for complete search history.

(56) References Cited

U.S. PATENT DOCUMENTS

| | | | | |
|---|---|---|---|---|
| 859,082 | A * | 7/1907 | Kenter | 59/85 |
| 1,974,827 | A * | 9/1934 | Lutts et al. | 59/84 |
| 2,382,345 | A * | 8/1945 | St Pierre | 59/35.1 |
| 4,418,526 | A * | 12/1983 | Clement | 59/85 |
| 5,345,754 | A * | 9/1994 | Deramaux et al. | 59/30 |
| 5,983,620 | A | 11/1999 | Amoss | |

FOREIGN PATENT DOCUMENTS

| | | |
|---|---|---|
| FR | 2 581 150 A | 10/1986 |
| WO | WO 2007/068472 A1 | 6/2007 |

OTHER PUBLICATIONS

Det Norske Veritas, "Offshore Mooring Chain", Offshore Standard DNV-OS-E302 Booklet, Oct. 2008.
Det Norske Veritas Classfiication AS, Certification of Offshore Mooring Chain; Certification Notes, No. 2.6; Aug. 1995.
Ramnas Bruk AB, "RAMFOR TM and RAMFOR SLIM Connectors", SE-730 60 Ramnas, Sweden.

* cited by examiner

*Primary Examiner* — David Jones
(74) *Attorney, Agent, or Firm* — Vorys Sater Seymour and Pease LLP

(57) ABSTRACT

This invention relates to a connector, particularly to a shackle suitable for use in connecting two links of a chain or a chain to an anchor, more particularly to a connector comprising a first portion and a second portion, at least one first connector arm on the first portion and at least one second connector arm on the second portion, wherein both the first and second connector arms have multiple bearing surfaces, preferably six, and are able to engage one another when the connector is coupled by means of the bearing surfaces. The connector of the present invention has the advantage of having a break load of 1.3[0.0274 $d^2$(44−0.08 d) kN, wherein d is the nominal diameter, and preferably a thickness of 1.3 d.

20 Claims, 5 Drawing Sheets

CONNECTOR

FIELD OF INVENTION

The present invention relates to a connector, particularly to a joining link or shackle suitable for use in connecting chains or a chain and an anchor.

BACKGROUND OF INVENTION

Anchor chains for marine use can be connected using known designs of shackles. Shackles usually comprises at least two portions, each of which will usually connect with a respective link on separate chains or with a link on a chain and an anchor, before the two shackle portions are connected together to join the chains or the chain to the anchor. The shackle should preferably be capable of withstanding the same forces as the chain links, but this is often a difficult compromise for the multipart shackle and frequent inspections are needed to assess the condition of the shackles, which is costly and inconvenient.

There are many different styles of shackles, swivels and connecting links. The two main types of connecting links (chain or anchor) in use are Kenter style links or "Baldt" style links. The difference between the two is in the design of the way the links open and close. The Kenter link consists of two opposite halves that slide together. The Baldt link has a C-shaped body and uses two caps to connect the open end of the C together.

U.S. Pat. No. 5,983,620 to Amoss discloses a "Kenter" type detachable connecting link without button shoulders that shows no apparent loss of strength compared to one with button shoulders. Versatility, however, is increased, enabling one link to fit several chain sizes, instead of just one. Preferably the button is aligned with the link cross section.

French Patent 2 581 150 to Caron discloses two identical half-links with a male end and a female end. The two half-links form, by mutual interlocking, a link locked by a locking component. Each male end comprises a bearing surface composed of several staged elementary bearing surfaces. The invention applies to chains for boats and oil platforms.

WO 2007/068472 to Feuerstein discloses a connector, particularly to a shackle suitable for use in connecting two links of a chain, more particularly to a connector comprising a first portion and a second portion, at least one first connector arm on the first portion and at least one second connector arm on the second portion, wherein both the first and second connector arms have at least one bearing surface and are able to engage one another when the connector is coupled by means of the bearing surfaces.

However, none of the prior art connectors meet the new offshore standards established in 2009 by DNV-OS-E302. There are many classification societies such as ABS (American Bureau of Shipping), Lloyds, BV (Bureau Veritas), DNV (Det Norske Veritas), etc. that examine links and supervise the testing before certifying its use for a vessel or mooring setup under their classification. According to the new DNV standard, the breaking load (kN) of a grade R5 connector is $0.0320\ d^2(44-0.08\ d)$ (wherein d is the chain nominal diameter). Therefore, for example, the breaking load for a 76 mm shackle should be about 7009 kN under the new DNV standard. However, typical 76 mm shackles, regardless of the configuration have a break load of 6001 kN, which is well below the new DNV standards. Accordingly, there remains a need for a shackle that can meet the new DNV standards.

SUMMARY OF INVENTION

Accordingly, it is an object of the invention to provide a connector that meets the new DNV standards.

It is another object of the invention to provide a connector comprising a first portion and second portion, at least one connector arm (first connector arm) on the first portion and at least one connector arm (second connector arm) on the second portion, wherein the first and second connector arms are able to engage one another when the connector is coupled, each connector arm having at least one bearing surface, preferably a plurality of bearing surfaces, which engage one another in the coupled connector and which transmit force between the first and second portions. In a preferred embodiment at least six bearing surfaces are provided on each arm.

It is another object of the invention to provide a connector wherein the break load is at least $1.3[0.0274\ d^2(44-0.08\ d)$ kN, wherein d is the nominal diameter, which is 30% higher than the prior art.

It is another object of the invention to provide a connector with a break load of at least $1.3[0.0274\ d^2(44-0.08\ d)$ kN and a thickness of 1.30 d. In other words, it is an object to provide a connector that can meet current DNV standards while maintaining a thickness of no more than 1.30 d.

According to a preferred embodiment, the first portion has at least one further connector arm, hereinafter referred to as the "third connector arm", and the second portion also has at least one further connector arm, hereinafter referred to as the "fourth connector arm", wherein each connector arm comprises at least one shoulder, i.e., a first, second, third and fourth shoulder, respectively, and each shoulder has at least one bearing surface, i.e., a first, second, third and fourth bearing surface, respectively. The first and third connector arms provided on the first portion have at least six first bearing surfaces located on at least six respective first shoulders on the first connector arm and at least six third bearing surfaces located on at least six respective third shoulders on the third connector arm. The second and fourth connector arms provided on the second portion have at least six second bearing surfaces and at least six fourth bearing surfaces located on the at least six respective second and fourth shoulders. The first and second bearing surfaces and the third and fourth bearing surfaces are able to engage one another, so that force is transmitted between the two connector portions by the respective shoulders engaging one another in the coupled connector.

In another preferred embodiment, each of the connector arms typically has six shoulders and six bearing surfaces, wherein each bearing surface is provided on one corresponding shoulder.

In another preferred embodiment, one connector arm of a mating pair, e.g., first and second connector arms and third and fourth connector arms, respectively, has a different structure than the other connector arm of the mating pair. For example, one connector arm of the mating pair can have a head, and the other can have a socket in which the head at least partially engages. Each head and socket comprises at least one bearing surface. Where two connector arms are provided on each connector portion, one can have a head, and the other a socket, so as to engage with the socket and head respectively on the other connector portion, preferably head or socket on the first portion correspond to head or socket on the second portion, so that basically both portions of the connector have engaging members of equivalent geometry.

In another preferred embodiment, the bearing surfaces are provided on shoulders extending at least partially laterally outward from the head, and extending at least partially laterally inward from the socket. The shoulders on each mating pair of connector arms can have complementary shapes, so that the heads fill the sockets and leave little space for movement when the connector is coupled.

In another preferred embodiment, the bearing surfaces are typically aligned parallel to the longitudinal axis, i.e., the shoulders are "stacked" along the longitudinal axis of the connector. The first and third bearing surfaces are typically opposed to the second and fourth bearing surface, so that each first and third bearing surface faces one end of the coupled connector, and each second and fourth bearing surface of the coupled connector faces the opposite end of the connector. In the coupled connector, the bearing surfaces on the first portion and the second portion can then be trapped behind one another. Also, when the connector is coupled, at least two bearing surfaces on the connector arms of a mating pair of connector arms are engaged against one another in a flat plane that is perpendicular to the longitudinal axis of the connector. This arrangement can transmit force more efficiently, and reduces the tendency towards movement in the coupled connector.

The provision of at least six separate bearing surfaces on respective shoulders increases the total bearing surface area available to transmit force between the two connector portions, and reduces the pressure applied to each separate surface, thereby reducing fatigue damage of the components.

In another preferred embodiment, the at least six separate bearing surfaces are aligned along the longitudinal axis of the connector. This can avoid increases in cross sectional area of the connector necessary to bear the axial loads.

In a further preferred embodiment, the two portions are generally U-shaped, with a connector arm on each side of the U. Typically, the two arms on each connector portion can be a different length from one another, so that when the connector is coupled, the mating portions are not in the same plane on the connector but are axially offset with respect to one another.

In a further preferred embodiment, the two portions are connected by means of a connector pin. In another embodiment, the connector pin is optionally driven laterally through each of the portions of the coupled connector to secure them together. Driving the pin through the mating portions can be facilitated by axially offsetting the mating portions.

In a further preferred embodiment, the two portions are braced in the coupled connector by a spacer.

There has thus been outlined, rather broadly, the more important features of the invention in order that the detailed description thereof that follows may be better understood, and in order that the present contribution to the art may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may be readily utilized as a basis for the designing of other structures, methods and systems for carrying out the several purposes of the present invention. It is important, therefore, that equivalent constructions insofar as they do not depart from the spirit and scope of the present invention, are included in the present invention.

For a better understanding of the invention, its operating advantages and the aims attained by its uses, references should be had to the accompanying drawings and descriptive matter which illustrate preferred embodiments of the invention.

BRIEF DESCRIPTION OF THE DRAWINGS

FIG. 1b is a close-up side view of the head and socket from FIG. 1a;

DETAILED DESCRIPTION OF THE PREFERRED EMBODIMENTS

Figure 1A:
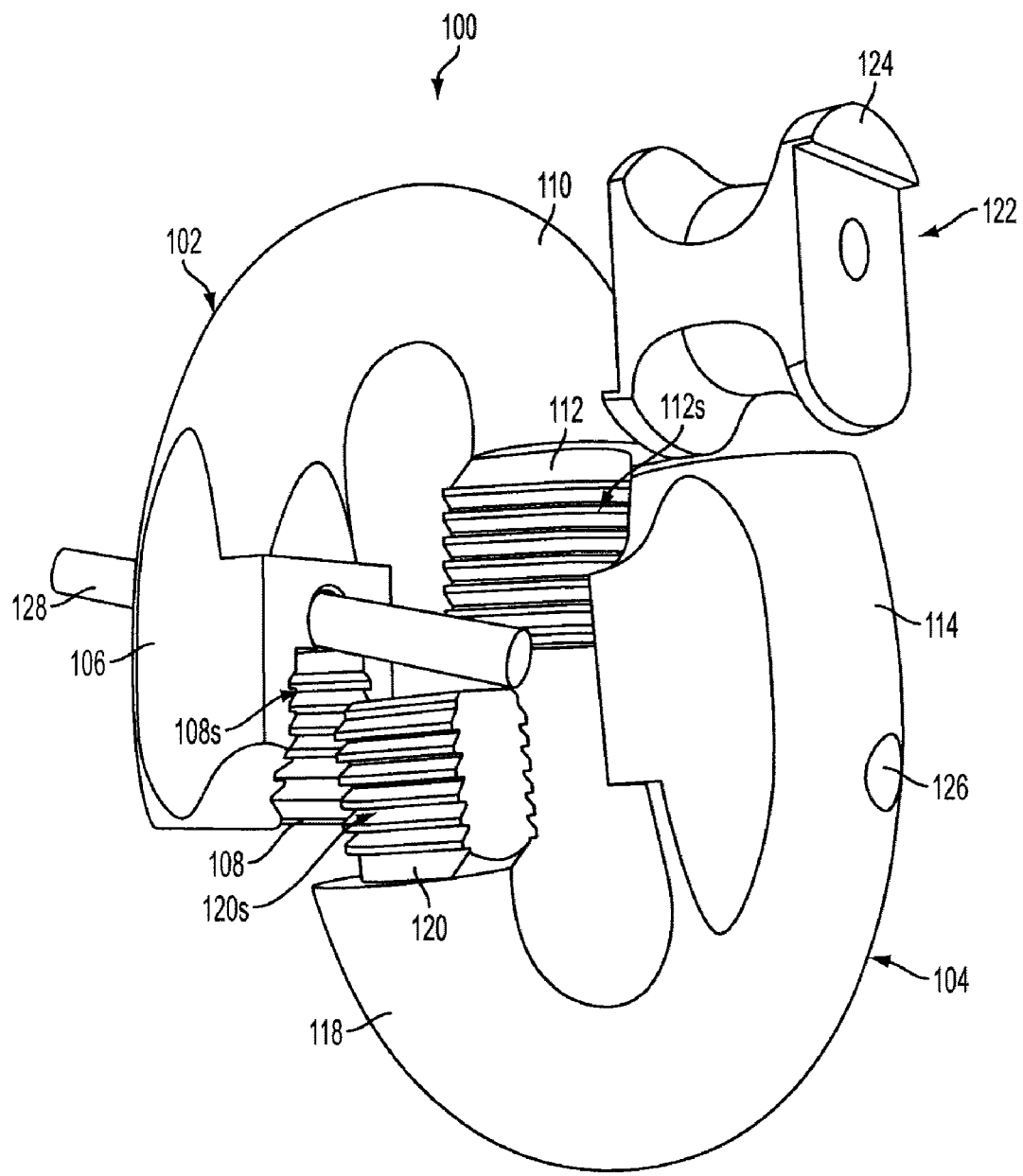
FIG. 1a is a perspective view of the connector of the present invention shown in disassembled form.
Figure 1B:
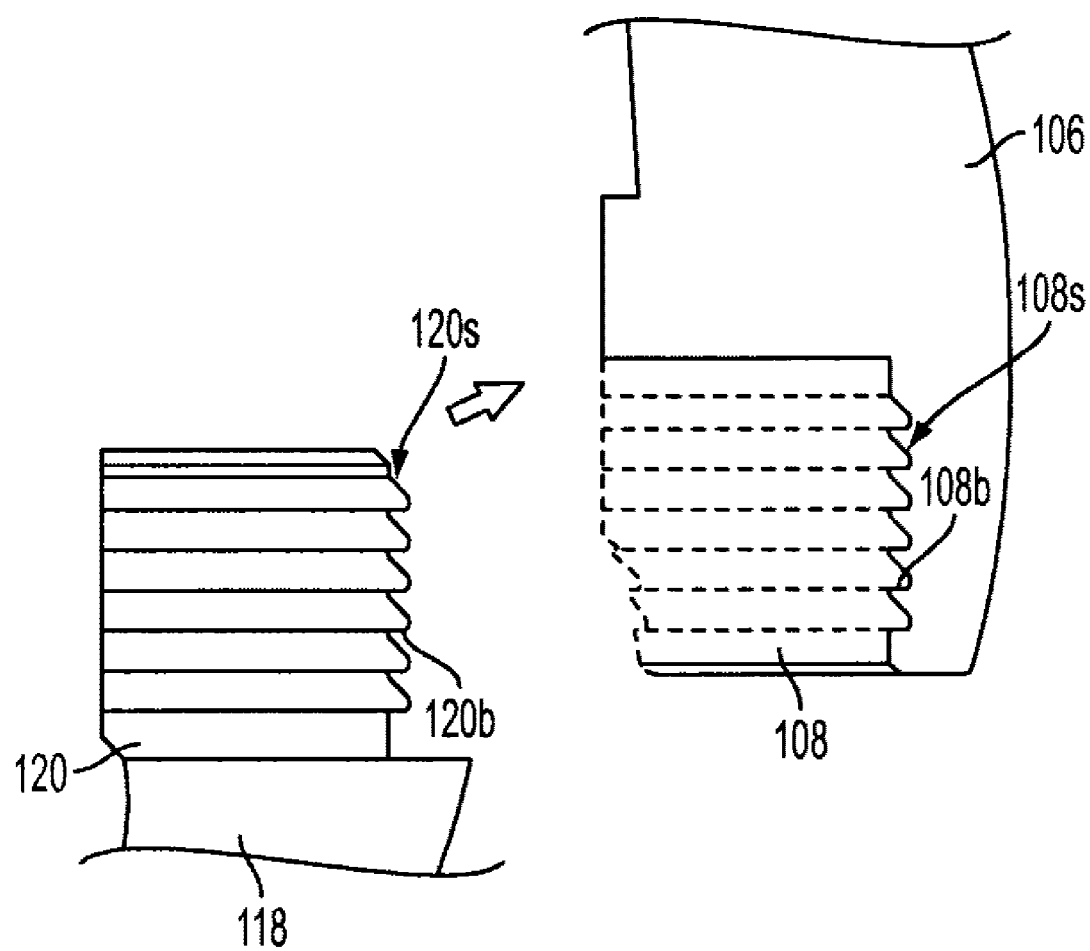
Figure 2:
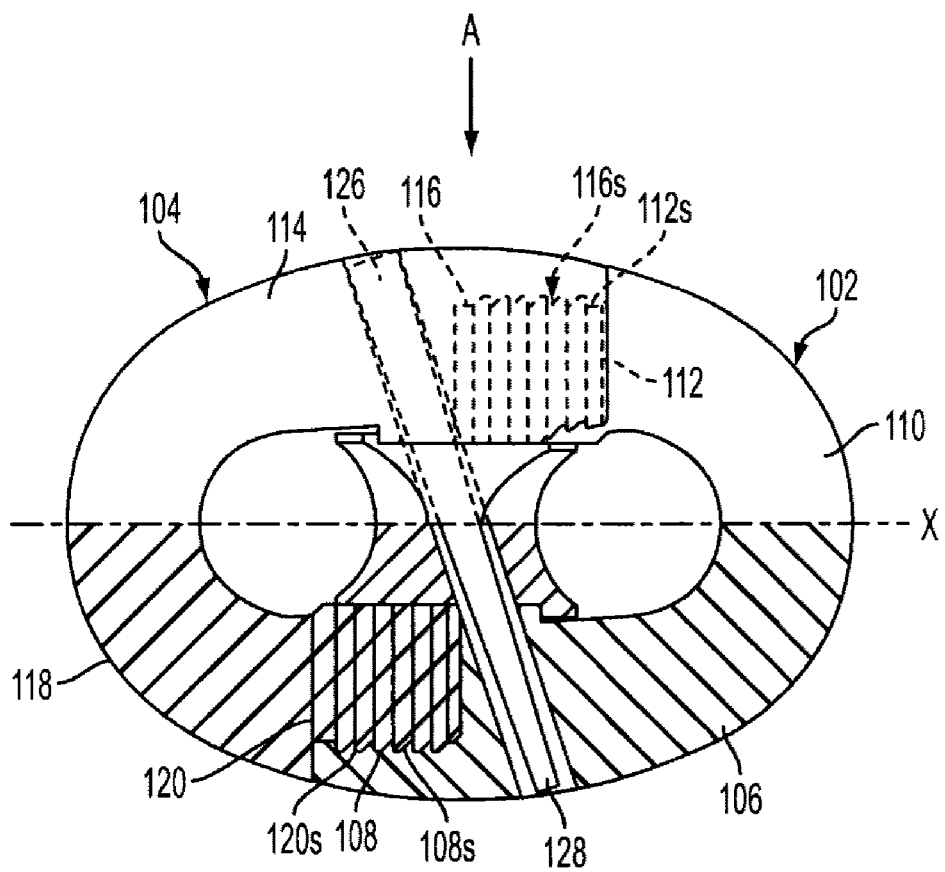
FIG. 2 is a side sectional view of the connector of FIG. 1.
Figure 3:
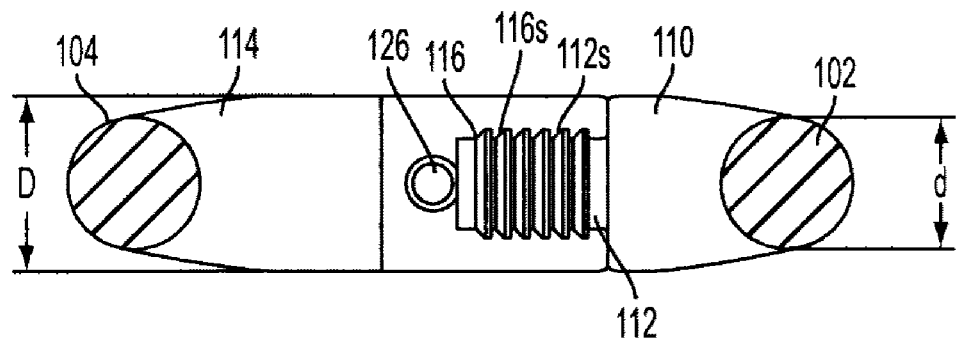
FIG. 3 is a sectional view of the connector of FIG. 1, viewed from arrow A in FIG. 2.

Referring now to FIGS. 1-3, a first preferred embodiment of a connector 100 has a first portion 102 and a second portion 104. The two portions 102, 104 are substantially similar. The coupled connector 100 has a longitudinal X axis, which also applies to both the first and second portion 102, 104, when the connector 100 is coupled.

The first connector portion 102 is generally U-shaped and has a first arm 106 with a socket 108 and a third arm 110 having a head 112. The socket 108 and the head 112 as engaging members are disposed at the open end of the first connector portion 102 extending away from the closed end of the U-shaped portion. The socket 108 has preferably six shoulders 108s protruding radially into the socket 108 and extending around the inner circumference of the socket 108. The head 112 on the third connector arm 110 has preferably six radially outwardly protruding shoulders 112s extending circumferentially around three sides of the head 112. The side of the head 112 that is closest to the X axis has no shoulder. All of the shoulders 112s, 108s are aligned in a plane parallel to the X axis.

The second connector portion 104 is also generally U-shaped and has a fourth arm 114 with a socket 116, and a second arm 118 having a head 120. Again, the head 120 and the socket 116 are disposed at the open end of the connector portion 104 extending away from the closed end of the U-shaped portion. The socket 116 has preferably six inwardly protruding shoulders 116s extending around the circumference of the socket 116.

The head 120 on the second connector arm 118 has six outwardly protruding shoulders 120s extending circumferentially around three sides of the head 120. The side of the head 120 that is closest to the X axis has no shoulder. All of the shoulders 116s, 120s are aligned in a plane parallel to the X axis.

The shoulders 108s and 116s on the sockets 108, 116 have the same basic structure, as the shoulders 112s and 120s on the heads 112, 120. Therefore, in the interests of brevity and simplicity, only the details of the head 120 and the socket 108 will be described in detail, with reference to FIG. 1b.

Each head shoulder 120s is generally triangular in cross section, and has a bearing surface 120b facing the closed end of the second connector portion 104, and a support face that is generally facing the open end of the second connector portion 104. Each bearing surface 120b is flat and is disposed in a single plane that is generally perpendicular to the X axis. The bearing surfaces 120b are disposed in a single plane that is generally parallel to the X axis. The support surface tapers from the radially outermost edge of the bearing surface 120b back into the base of the head 120.

Each socket shoulder 108s is also generally triangular in cross section, and has a bearing surface 108b facing the closed end of the first connector portion 102, and a support face that is generally facing the open end of the first connector portion 102. Each bearing surface 108b is flat and is disposed in a single plane that is generally perpendicular to the X axis. The bearing surfaces 108b are disposed in a single plane that is generally parallel to the X axis. The support surface tapers from the radially outermost edge of the bearing surface 108b back into the root of the socket 108.

It will be noted that each bearing surface 108b, 120b faces the closed end of the first and second connector portions, 102, 104, respectively, whether disposed on a socket 108, 116, or a head 112, 120, and whether disposed on the first or second connector portion 102, 104, respectively. Therefore, when the first and second connector portions 102, 104, respectively, are facing one another before being coupled together, the bearing surfaces 108b, 120b to be engaged with one another are facing in opposite directions towards the closed ends of their respective connector portions 102, 104.

A spacer 122 is provided in order to brace the arms apart in the coupled connector 100. The spacer 122 has a flat outer surface on each side, with a step 124 that engages in a corresponding recess on the inner surface of the arms 106, 114, so that the spacer 122 can fit between the arms in only one configuration. In this configuration, a bore 126 that extends through the spacer 122 lines up with bores through the arms 106 and 114, to allow the passage of a fixing pin 128 through the bore 126 to secure the first and second connector portions, 102, 104, respectively, and the spacer 122 together in a particular configuration. The fixing pin 128 and the bore 126 each have tapered sides, so that when the fixing pin 128 is hammered into the bore 126, it lodges in position, fixing the connector 100 together. The fixing pin 128 can be sealed within the bore 126, by melting or hammering a lead plug within the opening of the bore once the fixing pin 128 is in position.

When the connector 100 is to be coupled, the first and second connector portions 102, 104, respectively, of the connector 100 are arranged side-by-side with their open ends facing one another, as shown in FIG. 1a, so that the head 120 on the second connector arm 118 is lined up with the socket 108 on the first connector arm 106, and the head 112 on the third connector arm 110 is lined up with the socket 116 on the fourth connector arm 114. The fixing pin 128 is removed from the bore 126, and the heads 112, 120 are inserted into the sockets 108, 116 by moving the two portions 102, 104 sideways towards one another, so that the bearing surfaces 108b, 120b, 112b and the support surfaces on the heads 112, 120 and the sockets 108, 116 interlock with one another. The spacer 122 can then optionally be slid into the space between the arms 106, 114, so that the steps 124 on the spacer 122 engage in the corresponding recesses on the arms 106, 114, whereby the bore 126 through the spacer 122 is aligned with the bores through the arms 106, 114. The fixing pin 128 is then hammered into the bore 126 and sealed as described above.

In this configuration, the bearing surfaces 120b on the head 120 on the second connector arm 118 are locked behind the bearing surfaces 108b on the socket 108 on the first connector arm 106. Likewise, the bearing surfaces 112b on the head 112 on the third connector arm 110 are locked behind the bearing surfaces on the socket 116 on the fourth connector arm 114.

When the coupled connector 100 is in tension, the force is transmitted between the first and second portions 102, 104 by the bearing surfaces 108b, 120b, 112b that are locked against one another. The support surfaces on each component support the bearing surfaces 108b, 120b, 112b against deformation.

The bearing surfaces 108b, 120b, 112b are aligned with one another in the same plane that is parallel to the main X axis of the connector 100. The axial load borne by the bearing surfaces 108b, 120b, 112b is spread between the six shoulders 108s, 120s, 112s, 116s on each arm 106, 118, 110, 114 of each connector portion 102, 116, thereby reducing the force borne by any specific shoulder 108s, 120s, 112s, 116s.

The angle of taper of the support surface, and the extent to which the bearing surfaces 112b, 120b protrudes radially from the base of the heads 112, 120 is variable between different embodiments. Increasing the radial extent of the bearing surfaces 112b, 120b increases the surface area through which force is transmitted, which is beneficial, because it reduces the pressure applied on each shoulder 112s, 120s.

As seen in FIG. 3, the connector has a thickness D and a nominal diameter d. According to a preferred embodiment, D=1.3 d.

Figure 4:
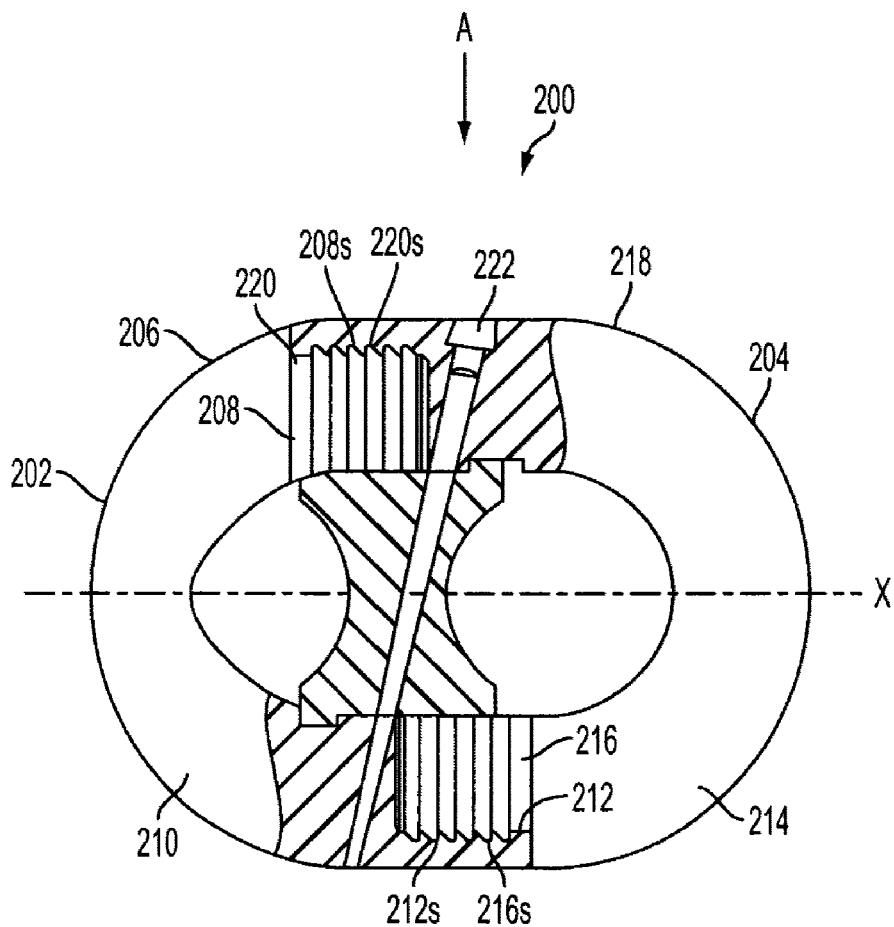
FIG. 4 is a side sectional view of another embodiment of the connector of the present invention.
Figure 5:
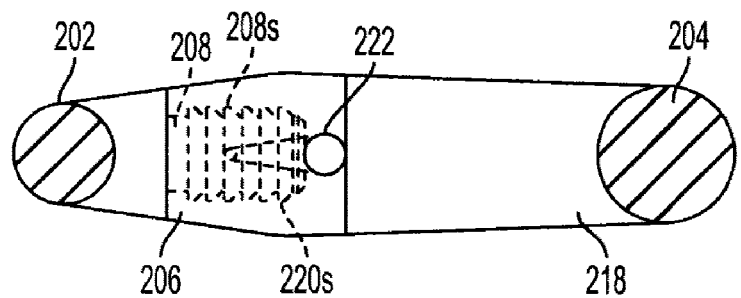
FIG. 5 is a sectional view of the connector of FIG. 4, viewed from arrow A in FIG. 4.

FIGS. 4 and 5 show a second embodiment 200, in which the first and second portions 202, 204 are different from one another, but are attached in the same way as described above. Whereas the connector 100 is most useful for connecting two links of chain that are of similar size, the second embodiment 200 shown in FIGS. 4 and 5 is designed for connecting different size/weights of chain or a chain to an anchor. Thus, the first portion 202 of the second embodiment 200 has an arm 206 with a head 208, having shoulders 208s, as previously described, and an arm 210 having a socket 212 with internal shoulders 212s as previously described. The second portion 204 has an arm 214 with a head 216 and shoulders 216s, and a further arm 218 with a socket 220 and internal shoulders 220s, as previously described. A bore 222 runs through the first and second portion 202, 204, respectively. The closed end of the first portion 202 is relatively narrow, and is designed for use with lightweight chain. The closed end of the second portion 204 has a heavier gauge, and is designed for use with heavyweight chain or anchor. The components of the second embodiment 200 function in the same way as those described for the connector 100.

Example

Figure 6:
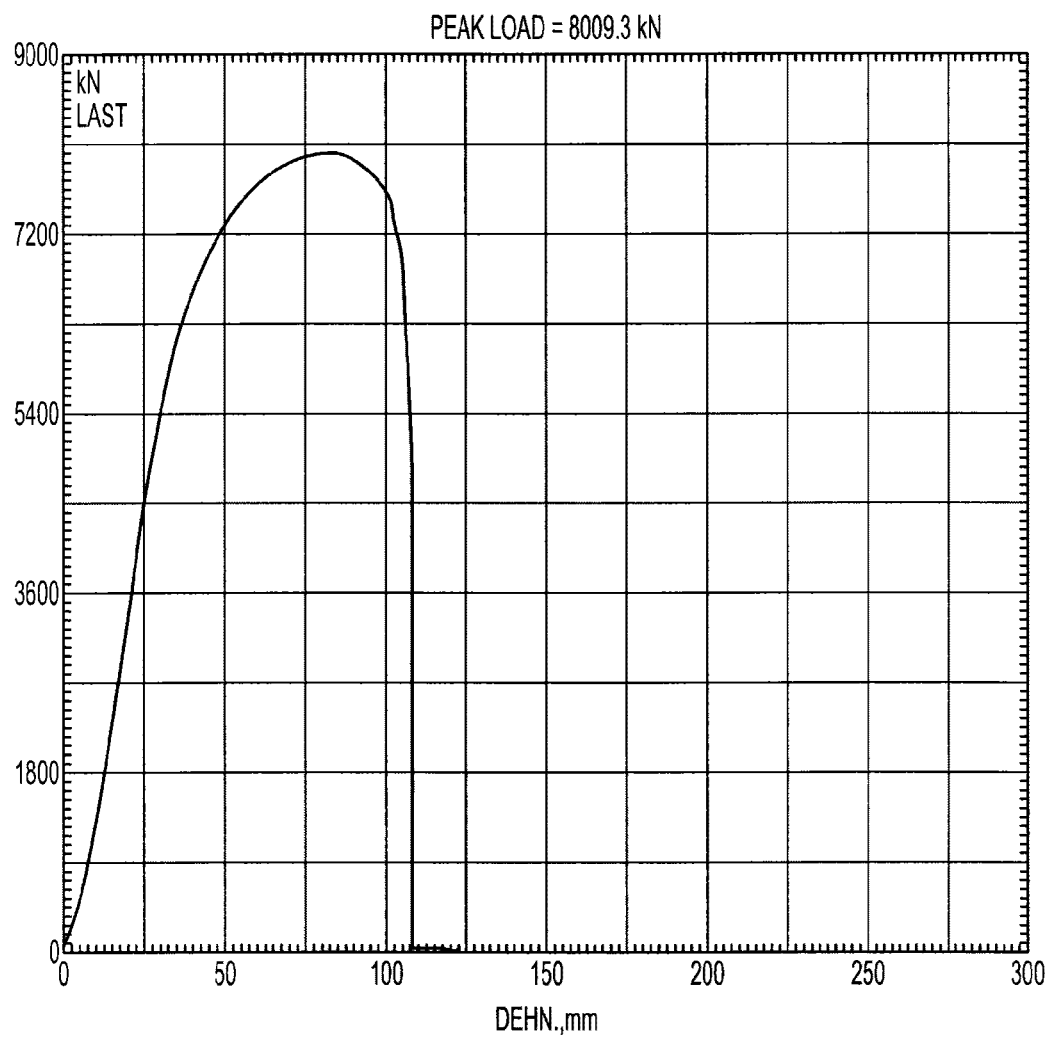
FIG. 6 is a graph of a break load test for the connector of the present invention.

A break load test was conducted on a 76 mm/3" connector, wherein D=1.30 d, as shown in FIGS. 1-3. FIG. 6 is a graph showing the break load test results. Although only a 16% improvement was expected, the break load test surprisingly yielded a break load of 8009.3 kN. In other words, the connector 100 of the present invention yielded a break load that was surprisingly 33% better than the connectors of the prior art. Moreover, the break load test also showed that the connector 100 failed in the crown area, rather than at the locking mechanism. Traditionally, such connectors fail at the locking mechanism. In this test, however, the locking mechanism remained intact and in fact, even after the connector of the present invention failed, the locking mechanism remained intact and was easily disassembled.

Having now described a few embodiments of the invention, it should be apparent to those skilled in the art that the foregoing is merely illustrative and not limiting, having been presented by way of example only. Numerous modifications and other embodiments are within the scope of the invention and any equivalent thereto. It can be appreciated that variations to the present invention would be readily apparent to those skilled in the art, and the present invention is intended to include those alternatives.

Further, since numerous modifications will readily occur to those skilled in the art, it is not desired to limit the invention to the exact construction and operation illustrated and described, and accordingly, all suitable modifications and equivalents may be resorted to as falling within the scope of the invention.

What is claimed is:

1. A connector for connecting links of chain or chains to anchors comprising a first portion and a second portion, at least one first connector arm on the first portion and at least one second connector arm on the second portion, wherein both the first and second connector arms have multiple bearing surfaces and are able to engage one another when the connector is coupled by means of the bearing surfaces, and wherein the connector has a nominal diameter d and a break load of at least $1.3[0.0274\ d^2(44-0.08\ d)$ kN.

2. The connector of claim 1, wherein the connector has a thickness of 1.3 d.

3. The connector of claim 1, wherein the connector has about six bearing surfaces.

4. The connector of claim 1, wherein the bearing surfaces are arranged perpendicular to a longitudinal X axis of the connector.

5. The connector of claim 1, wherein the bearing surfaces are aligned along a longitudinal X axis of the connector.

6. The connector of claim 1, wherein the first portion has at least one further arm, a third connector arm, and the second portion has at least one further arm, a fourth connector arm, and wherein the first, second, third and fourth arms comprise at least six first, second, third and fourth shoulders, respectively, each shoulder further comprising at least one first, second, third and fourth bearing surfaces, respectively.

7. The connector of claim 6, wherein the first connector arm and the second connector arm are able to form a first mating pair of connecting arms, the third connector arms and the fourth connector arm are able to form a second mating pair of connector arms, wherein the bearing surfaces on the connector arms of a mating pair of connector arms are engageable against one another in a flat plane that is perpendicular to the longitudinal X axis of the connector.

8. The connector of claim 6, wherein the first connector arm and the second connector arm are able to form a first mating pair of connecting arms, the third connector arms and the fourth connector arm are able to form a second mating pair of connector arms, and wherein in the first and second mating pair, one of the connector arms has a different structure as an engaging member from the other connector arm.

9. The connector of claim 6, wherein on the first portion, at least one arm has a head and on the second portion, at least one arm has a socket, wherein the socket is adapted for at least partially receiving the head.

10. The connector of claim 9, wherein on the first portion, another arm has a socket, wherein on the second portion, another arm has a head, and wherein the head and socket on the first portion correspond to the socket and head on the second portion, respectively.

11. The connector of claim 10, wherein the shoulders extend at least partially laterally outward from the head and at least partially laterally inward from the socket.

12. The connector of claim 11, wherein the shoulders on each mating pair of connector arms have a complementary shape.

13. The connector of claim 6, wherein the first and second portions are substantially U-shaped and have one connector arm on each side of the U.

14. The connector of claim 13, wherein the first and third connector arms have a different length from each other, wherein the second and fourth connector arms have a different length from each other, and wherein the bearing surfaces of the first and second connector arms and of the third and fourth connector arms are able to mate axially offset with respect to one another.

15. The connector of claim 6, wherein the first and second portions are connectable by means of a connector pin.

16. The connector of claim 15, wherein the connector pin is drivable laterally through the first and second portions when the connector is coupled for securing the first and second portions.

17. The connector of claim 6, wherein the connector arms of the first and second portions are braceabale with the connector is coupled by a spacer.

18. A connector comprising a first portion and a second portion, at least one first connector arm on the first portion and at least one second connector arm on the second portion, wherein both the first and second connector arms have at least six bearing surfaces and are able to engage one another when the connector is coupled by means of the bearing surfaces.

19. The connector of claim 18, wherein the connector has a nominal diameter d and a break load of at least $1.3[0.0274\ d^2(44-0.08\ d)$ kN.

20. The connector of claim 19, wherein the connector has a thickness of 1.3 d.

* * * * *